W. W. WHALEY.
FLY SWATTER.
APPLICATION FILED MAY 24, 1918.
1,293,591.
Patented Feb. 4, 1919.
2 SHEETS—SHEET 2.
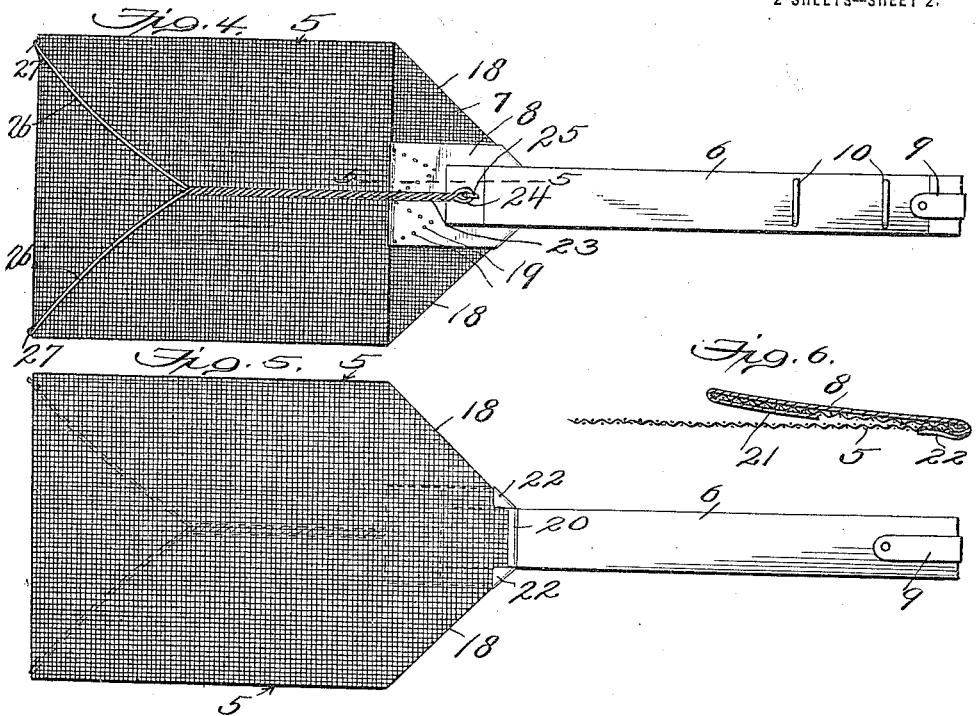
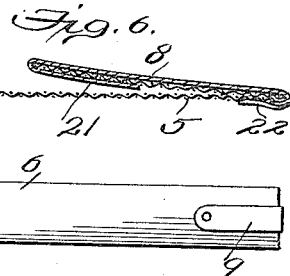
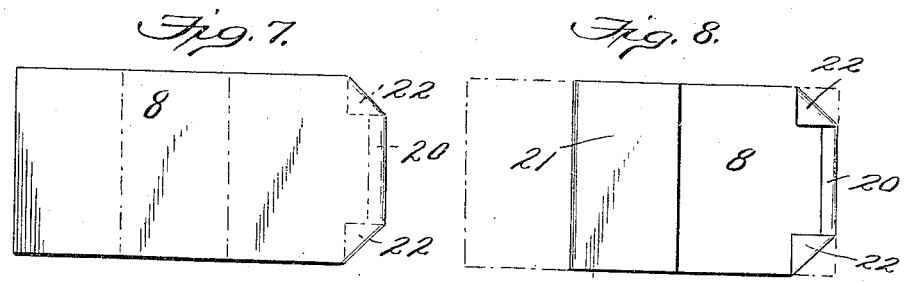
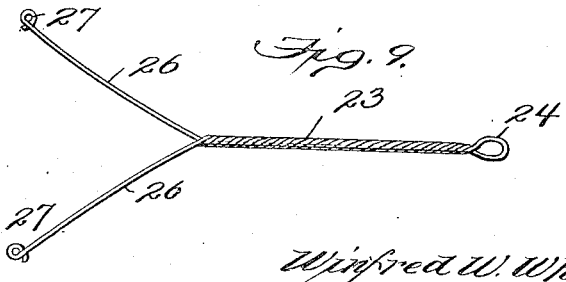
Witness
C. F. Kesler
Chas. S. Hyer
Inventor
Winfred W. Whaley
By
Omis L. Norris
Attorney

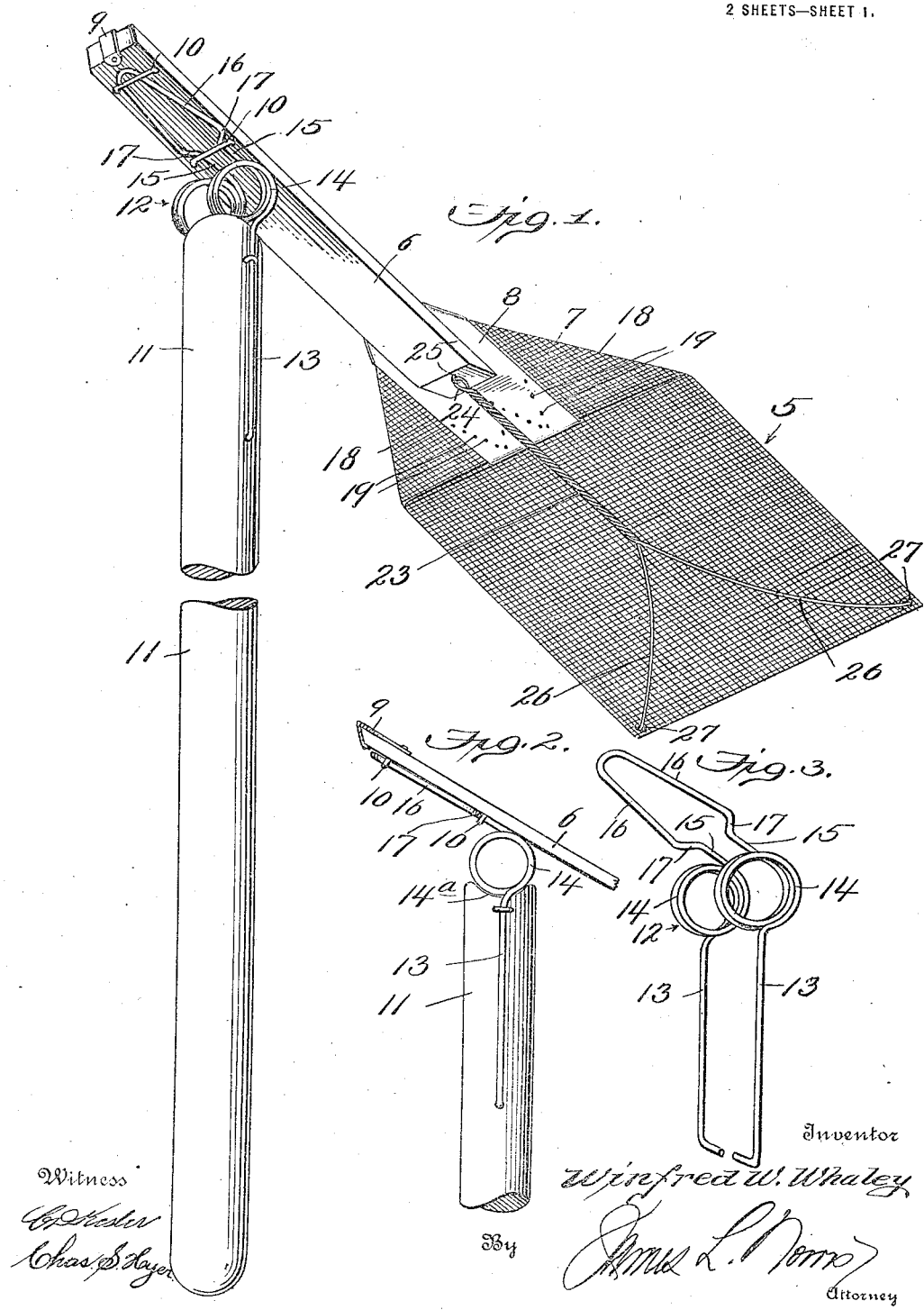

UNITED STATES PATENT OFFICE.

WINFRED W. WHALEY, OF WILMINGTON, NORTH CAROLINA.

FLY-SWATTER.

1,293,591.   Specification of Letters Patent.   Patented Feb. 4, 1919.

Application filed May 24, 1918. Serial No. 236,308.

*To all whom it may concern:*

Be it known that I, WINFRED W. WHALEY, a citizen of the United States, residing at Wilmington, in the county of New Hanover and State of North Carolina, have invented new and useful Improvements in Fly-Swatters, of which the following is a specification.

This invention relates to fly swatters, and the main object of the same is to provide a device of this kind that may be so adjusted and operated as to kill flies and insects in any place in a room and readily convertible for service from a swatter having a short handle to one having a long or extension handle. A further object of the invention is to provide a fly swatter extension or long handle with a spring attachment for connection to the handle of any ordinary fly swatter and whereby flies and insects may be reached at elevations that would be inaccessible by the use of the ordinary swatter and also permitting a yielding action or spring rebound of the body of the swatter so as to cause the latter to have a slapping action and thus effectively kill flies and insects. A still further object of the invention is to provide a fly swatter having a novel detail construction and arrangement of parts of a strong and durable character and one wherein the body is held in normal shape and operative condition against bending, particularly after a period of use.

With these and other objects and advantages in view, the invention consists in the construction and arrangement of the several parts which will be more fully hereinafter described and claimed.

In the drawings:

Figure 1 is a perspective view of a fly swatter shown yieldingly connected to an extension or elongated handle embodying features of the invention.

Fig. 2 is a side elevation of the elongated or extension handle and the spring attachment therefor illustrated in side elevation.

Fig. 3 is a detail perspective view of the spring attachment for the extension handle.

Fig. 4 is a top plan view of the swatter with the usual short handle and also embodying features of the invention.

Fig. 5 is a bottom plan view of the swatter with the usual short handle as shown by Fig. 4.

Fig. 6 is a longitudinal vertical section on an enlarged scale on the line 5—5, Fig. 4.

Fig. 7 is a detail plan view of a metal clip for holding the handle end of the swatter body in shape and providing means for securing the usual short handle thereto, the clip being shown partially folded in full lines and completely folded in dotted lines.

Fig. 8 is a plan view of the metal clip as shown in Fig. 7, looking toward the opposite side thereof.

Fig. 9 is a detail view of the holding spring for the swatter body.

The numeral 5 designates a swatter body preferably constructed of wire gauze of suitable mesh and having the usual short handle 6 connected to a reduced end 7 of the swatter body. The handle 6 is attached to a metal securing clip 8 which serves to maintain the rear folded end of the body in proper shape. Over the free end of the handle 6 a leather strip 9 is secured to prevent slipping of the handle head in operative position, and to one side of the handle at a distance inwardly from the free end a pair of staples or metallic loops 10 are driven into the handle and serve as part of the means for attaching the said handle to an extension handle 11 shown by Figs. 1 and 2. The extension handle 11 may be of any length desired and as a preferred means for detachably securing the handle 6 thereto a yielding connector 12 is used, as shown in detail by Fig. 3, said connector being preferably formed of spring wire and bent to provide opposite parallel legs 13 of suitable length which are secured to diametrically opposite points on the upper extremity or one end of the extension handle 11, the said legs 13 continuing into spring coils 14 which are located close to the end of the extension handle and over said end, the latter having a concave seat 14ª to receive said coils. The coils 14 of the spring connector 12 continue into parallel members 15 forming the inner portion of a catch 16 in the form of a tapering head with inner lateral bends 17 continuing into the members 15 and whereby, when the catch or head 16 is inserted through the inner staple or loop 10 on the handle 6 of the swatter, the lateral bends 17 will be contracted and forced through the said staple or loop and then spring apart to temporarily lock and positively retain the handle 6 and swatter body 5 in connection with the extension handle 11. When the catch 16 is inserted through the inner staple 10, the outer staple is engaged by the reduced end thereof as clearly shown by Fig. 1, and by this means the handle 6 and body 5 are positively held in connection with the end of the extension handle 11. A detachment of the connector 12 or the catch 16 from the staples 10 of the handle 6 may be very readily accomplished and the swatter may then be used in the ordinary manner of a short handle fly or insect killing means.

As hereinbefore specified, the body 5 of the swatter is preferably formed of wire gauze and of suitable dimensions. The rear end of the body 5 is folded inwardly on opposite sides of the center at about angles of 45°, as at 18, the folds extending far enough over on one side of the rear end of the said body for engagement therewith by the metal clip 8 which is indented or partially punctured, as at 19, to secure the same to the portions of the wire gauze or reticulated body 5 to which it is applied. The metal clip will be preferably formed of tin or some other sheet metal having sufficient rigidity to serve the purpose designed therefor and is clearly shown in detail by Figs. 7 and 8. This clip primarily consists of a rectangular strip of sheet metal having one end edge doubled over to form a narrow fold 20 which embraces the rear reduced extremity of the body 5 after the inner folds of the body have been made, the strip of sheet metal being intermediately bent to partially embrace the inner portions of the folds of the body, as at 21, and after this last bend of the clip has been formed and tightly embraces the inner folds at the rear end of the body, the indentations or partial punctures 19 are then produced by any suitable tool adapted for the purpose. To complete the application of the clip the corners of the rear end thereof where the fold or embracing bend 20 is made are inturned over the adjacent opposite portions of the rear reduced part of the body 5, as at 22. By this means the clip is firmly secured to the rear end of the body 5 of the swatter and said rear end is reinforced and strengthened by the clip as it is proposed to make the latter of considerable width and length so as to provide a good foundation for the securement of the handle 6 as well as a reliable support for the rear end of the body 5.

The body 5 is maintained in proper flat shape against distortion and breakage by a holding spring consisting of a twisted stem 23 terminating in a rear loop or eye 24 which is secured by a staple 25 or other means to the forward end of the handle 6. From the twisted stem 23 arms 26 diverge and are secured by terminal loops or eyes 27 to the corner portions of the free end of the body 5. This spring embodying the stem 23 and the arms 26 is applied to what may be termed the back of the body 5 of the swatter so as to leave the opposite side clear for action in killing flies or insects.

In operating the improved swatter in the usual manner the handle 6 is grasped and the body 5 is positioned so as to have the side thereof opposite that over which the twisted stem 23 and spring arms 26 are located lowermost so that the swatting action will be against the resistance of the spring arms 26 and stem 23. In using the device with the extension handle 11 it is attached to the latter through the medium of the connector 12, as hereinbefore explained, and the said extension handle so held and manipulated as to cause the handle 6 and swatter body 5 to swing resiliently relatively to the end of the said extension handle to which the connector 12 is secured, care being taken to hold the extension handle in proper position to bring the body 5 with a flat slapping action against the fly or insect sought to be destroyed. This operation of the swatter with the extension handle may be readily carried on without in the least injuring the wall, molding or beading that may be applied to the wall. When the extension handle is used, flies or insects on side walls or on ceilings may be easily reached and killed with material advantages in devices of this class.

The metal clip 8, as shown by Fig. 6, is bent over and secured to the infolded portions 18 solely, the adjacent portion of the body of the swatter being free from the rear reduced end of said body produced by the infolding of the opposite portions thereof so that the said body will have a natural or free yielding action with less liability to breakage or fracture than would be the case if the clip was solidly secured to all parts of the rear extremity of the swatter body.

I claim as my invention:

1. A fly swatter having the usual handle, an extension handle, and a spring connector having intermediate coils and permanently attached to one extremity of the extension handle with the coils adjacent to the end of the latter handle and also having a shouldered spring loop for detachably engaging a portion of the handle of the swatter, the coils of the connector forming the sole pivot means between the swatter handle and extension handle.

2. A fly swatter having the usual handle, an extension handle, and a spring connector permanently secured to the extension handle and having one extremity formed for separably attaching it to the swatter handle, the connector having intermediate coils forming the sole pivot means between the two handles, the said attaching extremity being disposed at an upward angle of inclination relatively to the coils to normally dispose the swatter and its handle obliquely across the end of the extension handle.

3. A fly swatter having the usual handle, an extension handle, and a spring connector having intermediate coils and attaching extremities respectively permanently secured to the extension handle and separably attached to the swatter handle, the coils being between and forming the sole pivot connection for the handle, and the extremity separably attached to the swatter handle extending at an upward angle of inclination relatively to the coils to normally dispose the swatter and its handle obliquely across the end of the extension handle.

4. A fly swatter having the usual handle, an extension handle, and a connector having one extremity permanently secured to the extension handle and the remaining extremity separably attached to the swatter handle to permit independent use of the swatter and its handle, the connector having intermediate coils serving as the sole pivot means between the two handles and also as resilient means for disposing the swatter and handle in normal relation subsequent to operating movement of the swatter, the extremity of the connector secured to the extension handle being straight and in line with the diameters of the coils, and the opposite extremity thereof separably attached to the swatter handle and projected upwardly at an oblique angle to the top portion of the coils to normally dispose the swatter and its handle obliquely across the upper end of the extension handle.

5. A swatter having the usual handle with loops thereon in spaced relation, an extension handle, and a spring connector permanently secured to one extremity of the extensible handle and provided with a yielding locking catch to separably engage the loops of the swatter handle, the connector having intermediate coils serving as the sole pivot means between the two handles when connected thereby.

6. A fly swatter having the usual handle, an extension handle having a concave seat at one end, and a spring connector separably attached to the swatter handle and permanently secured to the end of the extension handle provided with the seat, the connector having intermediate coils partially engaging said seat and serving as the pivot means between the two handles.

7. A connecting device for a fly swatter and extension device, comprising intermediate coils to serve both as a resilient means and a pivot, and opposite extremities, one of the latter being formed with a tapered shoulder spring loop for separate attachment, and the other formed for fixed attachment.

8. A swatter having the usual handle with loops in spaced relation adjacent to the free extremity thereof, an extension handle, and a spring connector permanently secured to one extremity of the extension handle and provided with a yielding locking catch insertible through one of the loops of the swatter handle and engaging the other of said loops to form a detachable connection between the two handles, the connector serving also as a hinging device between the two handles.

9. A fly swatter having a handle, a wire gauze body with rear infolded corners, and a metal clip bent over and secured to the infolded portions of the rear end of the body and having the rear extremity doubled over and the corners inturned and bent flat against the adjacent portion of the body of the clip to bind against and secure the inwardly bent portions of the wire gauze, the main body of the swatter adjacent to the infolded portions held by the clip being free of the clip for yielding movement during the operation of the swatter, the handle being secured to the clip.

10. A fly swatter consisting of a wire gauze body having the rear extremity turned inwardly equally at opposing sides and folded, a metal clip having one extremity bent over the infolded portions only and secured to said portions and the opposite extremity bent over and secured by the bends to the rear reduced end of the wire gauze body, the main body of the swatter adjacent to the infolded portions held by the clip being free of the clip for yielding movement during the operation of the swatter, and a handle secured to the clip.

11. A fly swatter consisting of a wire gauze body having a handle secured thereto, and a spring comprising a twisted stem secured at its rear end to the handle and formed with divergent arms positively attached to the corner portions of the free end of the swatter body.

In testimony whereof I have hereunto set my hand in presence of two subscribing witnesses.

WINFRED W. WHALEY.

Witnesses:
H. S. MEREDITH,
H. M. OWEN.

Copies of this patent may be obtained for five cents each, by addressing the "Commissioner of Patents, Washington, D. C."